United States Patent
Panwar et al.

(10) Patent No.: US 10,901,747 B2
(45) Date of Patent: Jan. 26, 2021

(54) UNIFIED STORE BUFFER

(71) Applicant: Western Digital Technologies, Inc., San Jose, CA (US)

(72) Inventors: Deepak Panwar, Austin, TX (US); Muhammad Tauseef Rab, Austin, TX (US)

(73) Assignee: Western Digital Technologies, Inc., San Jose, CA (US)

( * ) Notice: Subject to any disclaimer, the term of this patent is extended or adjusted under 35 U.S.C. 154(b) by 79 days.

(21) Appl. No.: 16/261,251

(22) Filed: Jan. 29, 2019

(65) Prior Publication Data

US 2020/0174795 A1    Jun. 4, 2020

Related U.S. Application Data

(60) Provisional application No. 62/773,802, filed on Nov. 30, 2018.

(51) Int. Cl.
*G06F 9/46* (2006.01)
*G06F 9/38* (2018.01)

(52) U.S. Cl.
CPC .......... *G06F 9/3867* (2013.01); *G06F 9/3861* (2013.01)

(58) Field of Classification Search
None
See application file for complete search history.

(56) References Cited

U.S. PATENT DOCUMENTS

| | | | |
|---|---|---|---|
| 5,621,896 A | 4/1997 | Burgess et al. | |
| 8,688,628 B2 | 4/2014 | Riemers | |
| 9,244,839 B2 | 1/2016 | Sakthivelu et al. | |
| 9,672,044 B2* | 6/2017 | Tran | G06F 9/384 |
| 9,678,758 B2 | 6/2017 | Codrescu et al. | |
| 9,733,909 B2* | 8/2017 | Abdallah | G06F 8/443 |
| 10,423,423 B2* | 9/2019 | Eisen | G06F 9/3857 |
| 2015/0121010 A1 | 4/2015 | Kaplan et al. | |
| 2018/0253354 A1 | 9/2018 | Nishida et al. | |

* cited by examiner

*Primary Examiner* — Cheng Yuan Tseng
(74) *Attorney, Agent, or Firm* — Kowert, Hood, Munyon, Rankin & Goetzel, P.C.

(57) ABSTRACT

Techniques are disclosed relating to speculative execution of store instructions. In various embodiments, an integrated circuit includes an execution pipeline having a load store circuit. The load store circuit is configured to receive a first store instruction executable to store a first value in a memory accessible to the integrated circuit. Prior to the first store instruction committing, the load store circuit stores the first value in a store buffer. In response to the first store instruction committing, the load store circuit stores, in the store buffer, an indication that the first store instruction has committed. In various embodiments, the integrated circuit reads the stored indication to determine whether the first store instruction has committed and, responsive to the read indication, provides the first value for storage in the memory.

18 Claims, 5 Drawing Sheets

UNIFIED STORE BUFFER

The present application claims priority to U.S. Prov. Appl. No. 62/773,802, filed Nov. 30, 2018, which is incorporated by reference herein in its entirety.

BACKGROUND

Technical Field

This disclosure relates generally to processors, and, more specifically, to speculative execution of store instructions in a processor.

Description of the Related Art

Many processors implement a pipelined architecture in which an instruction is executed over multiple cycles as it progresses through multiple pipeline stages in the processor. To ensure better utilization of the pipeline, modern processors typically implement speculative execution in which an instruction may enter the pipeline and begin execution even though it is dependent on another instruction having a not-yet-determined outcome, which may indicate that the instruction did not need to be executed in the first place. For example, a processor may speculatively execute an addition instruction that is dependent on a branch instruction before the outcome of the branch instruction is known. If the outcome results in an execution path that includes the addition instruction, the result of the addition instruction can be determined more quickly than if the pipeline had stalled awaiting the outcome of the branch instruction. If, however, the outcome results in an execution path that does not include the addition instruction, any result of the addition instruction is unwarranted and can be discarded.

As such, a processor may temporarily store a determined result for a first instruction if it is dependent on a second instruction and the outcome of the second instruction is not yet known. Once the outcome of the second instruction is known and it can be determined that the result of the first instruction is wanted, the first instruction can be committed, and its result can then be recorded to update the state of the processor.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. An "execution pipeline configured to execute instructions" is intended to cover, for example, an integrated circuit that has circuitry (e.g., arithmetic logic units, load/store unit, etc.) that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a processor having eight processing cores, the terms "first" and "second" processing cores can be used to refer to any two of the eight processing cores. In other words, the "first" and "second" processing cores are not limited to processing cores 0 and 1, for example.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

A processor speculatively executing a store instruction may temporarily store a value awaiting a write to memory in a store buffer for pre-committed store instructions, so that the value can be discarded if it is later determined that the store instruction is not going to be committed. If, however, the store instruction is committed, a processor may then move the value to be written to a store queue for post-commit store instructions—a separate structure from the pre-commit store buffer. There, the value is maintained until it can be written memory. It may, however, remain in the post-commit store queue for one or more cycles as the memory subsystem may be occupied processing other store and load operations.

Having separate pre-commit and post-commit structures for storing the values of store instructions is an inefficient use of processor resources. For example, the post-commit structure may become full awaiting to have values written to memory while the pre-commit structure has space available for storing additional values. The full post-commit structure may result in the processor having to stall the execution pipeline because there is no way to repurpose the underutilized space in the pre-commit structure to hold additional values for post-commit store instructions.

The present disclosure described embodiments in which a processor includes a unified store buffer capable of storing data for both pre-commit and post-commit store instructions. As will be described in greater detail below, in various embodiments, a load store circuit of the processor receives store instructions executable to store data values in memory and stores the data values in the unified store buffer prior to the store instructions being committed. If a given store instruction commits, a corresponding indication is stored in the store buffer to indicate that its particular data value or values can be written to memory. This indication may later be accessed when contents of the store buffer are being written to memory in order to determine whether the particular data values can be written. If, however, the processor determines that the execution pipeline needs to be flushed (e.g., because it incorrectly predicted the outcome of an earlier branch instruction and needs to execute instructions along an alternate execution path), the load store circuit can examine the entries in the store buffer to determine which ones include data values of non-committed stores. It can then flush those values while preserving any data values of already committed stores so that they can still be stored in memory.

In various embodiments, storing data values of pre-commit and post-commit store instructions in this manner allows for a more efficient use of buffer resources as entries can be occupied by either data values of pre-commit store instructions or data values of post-commit store instructions—thus potentially reducing the likelihood for a pipeline stall as the unified store buffer is better able to accommodate a larger number of data values, for example, of post-commit store instructions if subsequent memory stages (e.g., data caches) are unable to currently process writes for those data values. Still further, in some embodiments, the unified store buffer as a single structure may occupy less die space on the processor than the two separate pre-commit and post-commit structures discussed above. Operation of the unified store buffer may also consume less power than operating the two separate structures.

Figure 1:
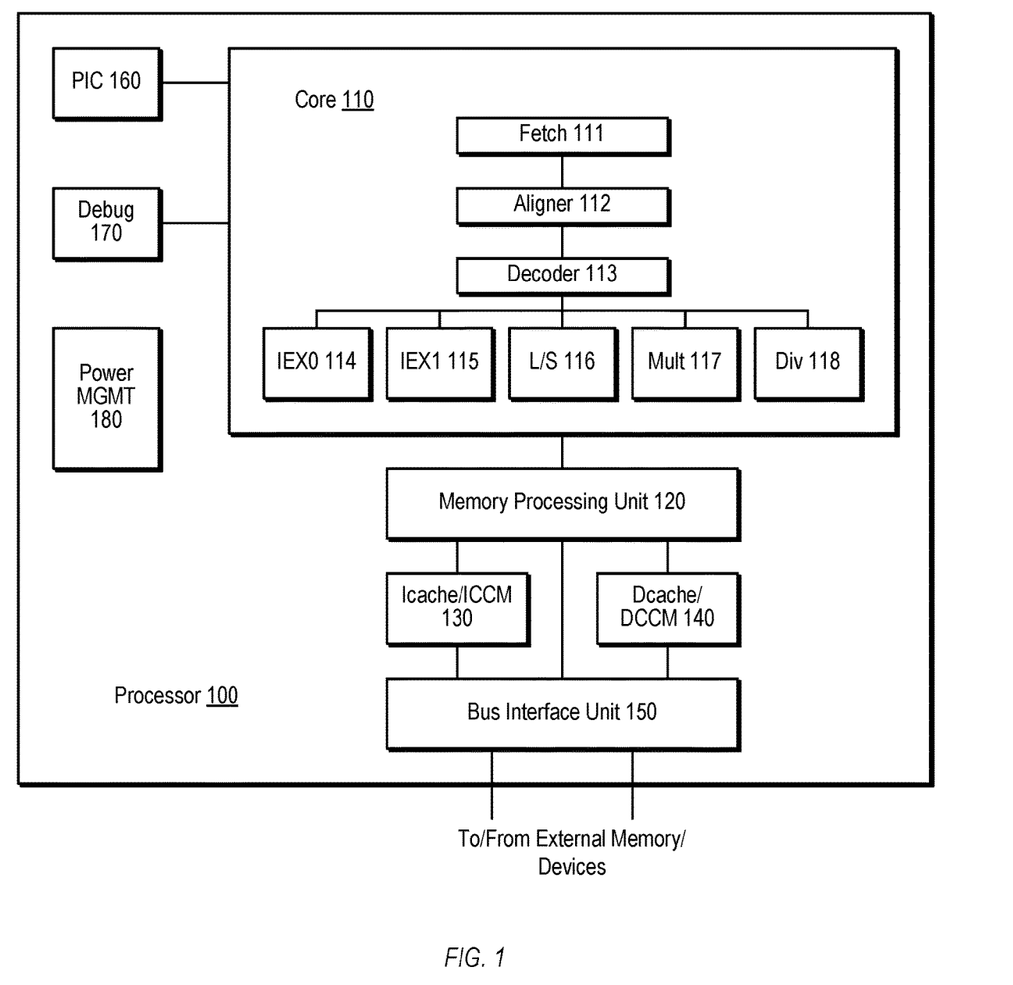
FIG. 1 is a block diagram illustrating one embodiment of an exemplary processor having particular microarchitecture.
Figure 2:
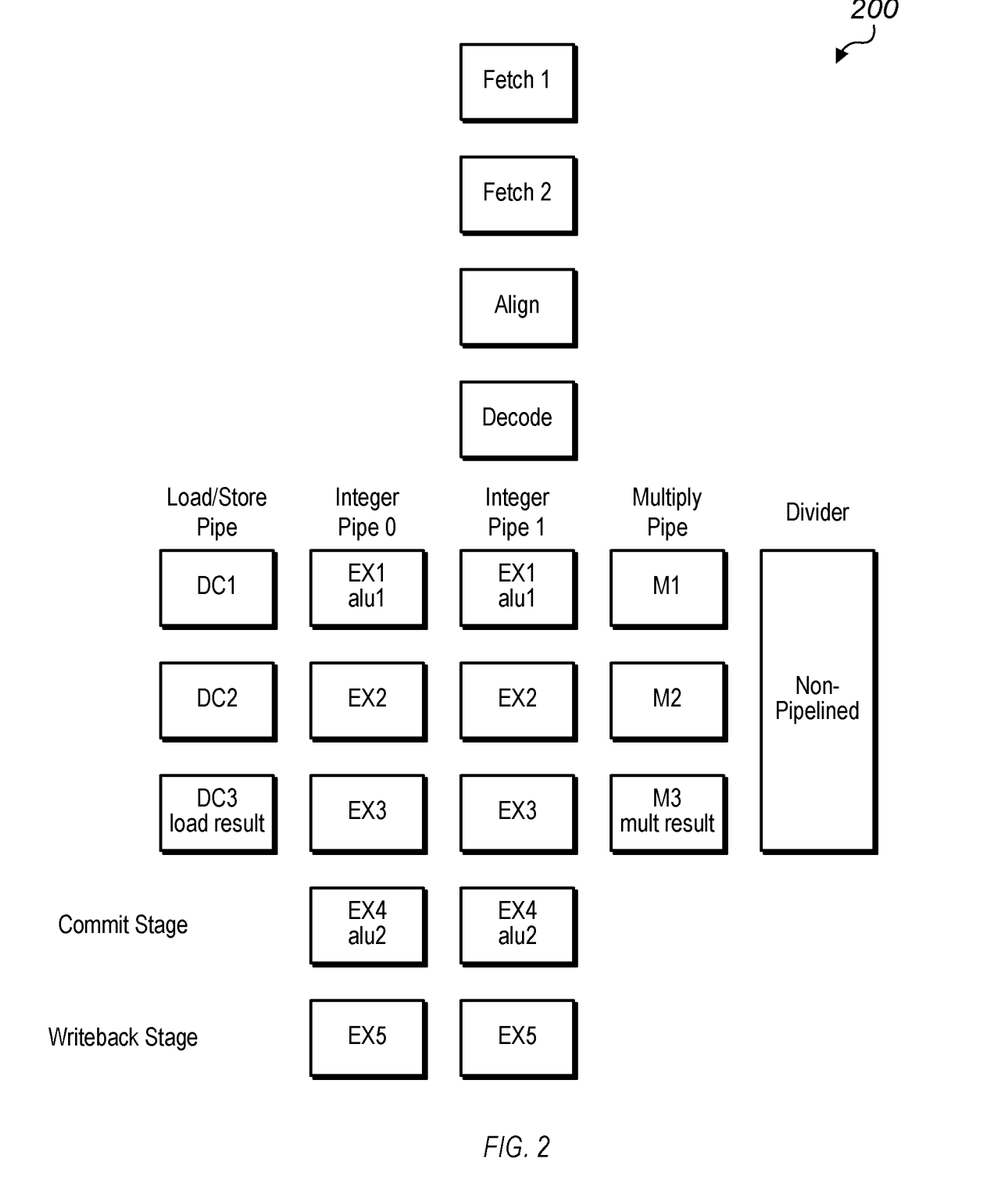
FIG. 2 is a block diagram illustrating one embodiment of execution timing within the processor.
Figure 3:
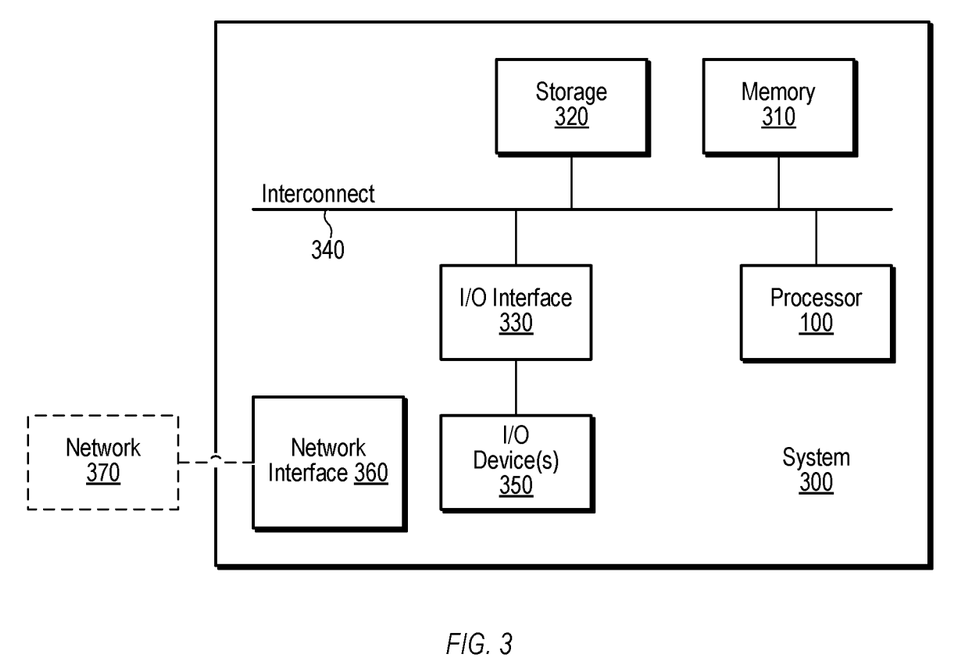
FIG. 3 is a block diagram illustrating one embodiment of an exemplary computer system.

This disclosure initially describes, with reference to FIGS. 1-3, an overview of a processor and its execution pipeline along with an example system configuration in which the processor may be employed. A unified store buffer, which may be included in the processor, is then described below with respect to FIGS. 4, 5A, and 5B.

Processor Overview

Turning now to FIG. 1, a block diagram of a processor 100 organized according to a particular microarchitecture is depicted. In some embodiments, processor 100 is configured to implement the RISC-V instruction set architecture (ISA), although other embodiments may implement other suitable ISAs. Preliminarily, it is noted that the microarchitecture shown in FIG. 1 represents merely one possible and non-limiting implementation.

In the illustrated embodiment, processor 100 includes an execution core 110 that includes a number of circuits configured to perform various aspects of instruction execution. In particular, core 110 includes a fetch circuit 111 coupled to an aligner circuit 112, which is in turn coupled to a decoder circuit 113. Decoder circuit 113 is coupled to a number of instruction execution circuits, including first and second integer execution circuits respectively denoted IEX0 114 and IEX1 115, along with load/store circuit 116, multiplier circuit 117, and divider circuit 118. Additionally, processor 100 includes a memory processing unit 120, an instruction cache 130, a data cache 140, a bus interface unit 150, a programmable interrupt controller 160, a debug controller circuit 170, and a power management circuit 180.

Generally speaking, core 110 may be configured to fetch instructions and necessary data, execute instructions, and write results either locally (e.g., to a register file) or into a memory subsystem. In particular, fetch circuit 111 may be configured to initiate this process by retrieving instructions for execution. In various embodiments, fetch circuit 111 may be configured to implement program counter logic and branch prediction circuitry in order to track the flow of program execution and attempt to predict the outcome of conditional branches in order to speculatively fetch branch targets. For example, fetch circuit 111 may implement a "gshare"-style branch predictor in which a table of branch direction predictors is used in combination with a branch target buffer (i.e., a cache of branch target addresses) along with the current program counter and an indicator of global branch history to generate a predicted address from which to fetch instructions. Any suitable branch prediction scheme may be employed, however.

The fetch address generated by fetch circuit 111 may be directed to instruction cache 130. In some embodiments, instruction cache 130 may be implemented as a pipelined, banked, set-associative cache that is accessed by performing an index lookup and a tag comparison to verify that the fetch address is in fact present in the cache. In the event of a cache miss, the fetch address may be sent to bus interface unit 150 to be retrieved from external memory coupled to processor 100. In other embodiments, an instruction closely-coupled memory (ICCM) may be provided in addition to or instead of instruction cache 130. Generally speaking, a CCM is a storage array defined by a directly addressable region of memory addresses; it differs from a cache in that there is no possibility of an access "missing" a CCM and thus having a variable latency depending on its hit/miss status. A CCM may thus provide storage that has relatively low access latency that is also predictably consistent, unlike a cache, which may improve the performance of certain computing workloads such as real-time applications. In some embodiments, an instruction read-only memory (IROM) may be provided in addition to or instead of an ICCM; an IROM may provide similar access timing characteristics as an ICCM but has fixed contents (e.g., determined at the time of manufacture) and cannot be written to.

In some ISAs, instructions may have variable lengths. For example, the RISC-V ISA defines a set of 32-bit instructions as well as 16-bit "compressed" variants of a subset of the 32-bit instructions. Accordingly, in some embodiments, aligner circuit 112 may be configured to identify instruction boundaries within the fetch stream and extract the corresponding instructions for further processing. For example, aligner circuit 112 may be configured to identify RISC-V 16-bit compressed instructions and convert them to their uncompressed 32-bit variants for downstream processing, which may simplify later processing relative to preserving the compressed instructions in their native format.

Decoder circuit 113 may be configured to receive fetched instructions from aligner circuit 112 and decode them in order to determine how they should be further processed within core 110. For example, decoder circuit 113 may examine the operand fields of instructions in order to determine instruction dependencies that may dictate when an instruction is ready to execute; if an instruction requires a result that is not yet available, decoder circuit 113 may delay its execution (and possibly the execution of upstream instructions) until its dependencies are satisfied. In some embodiments, decoder circuit 113 may attempt to group multiple instructions for concurrent execution. To simplify the complexity of this task, some embodiments of decoder circuit 113 may limit the number of instructions issued for concurrent execution. For example, although core 110 includes multiple execution units that could in theory operate concurrently, these execution units may be grouped such that only two instructions are issued per cycle by decoder circuit 113. In other embodiments, however, such limitations may not apply.

In some embodiments, decoder circuit 113 may implement additional operations. For example, decoder circuit 113 may detect synchronization attributes of particular instructions (e.g., instructions that may have special execution timing requirements relative to other instructions in order to ensure correct execution) and appropriately stall or freeze the execution pipeline in order to enforce those attributes. In some instances, decoder circuit 113 may also include a register file configured to implement the architected registers defined by the ISA and/or control/status registers defined by the ISA or the particular processor implementation, although these features may alternatively be implemented elsewhere within core 110.

Once processed by decoder circuit 113, instructions may then be issued to the appropriate execution circuit for execution. In the illustrated embodiment, core 110 includes two integer execution circuits IEX0 114 and IEX1 115, each of which may implement circuitry for executing arithmetic, logical, and shift instructions defined by the ISA. In the illustrated embodiment, IEX0 114 and IEX1 115 are each configured to implement two arithmetic/logic units (ALUs), for a total of four ALUs. As will be discussed below with respect to FIG. 2, the ALUs in each execution circuit may be configured to operate in successive pipeline stages rather than concurrently, in order to facilitate bypassing of results from one execution circuit to another.

In addition to the integer execution circuits, load/store circuit 116 may be configured to execute load and store instructions defined by the ISA. For example, load/store circuit 116 may be configured to perform address generation arithmetic and to present the resulting address to data cache 140 for processing. In some embodiments, like instruction cache 130, data cache 140 may be implemented as a pipelined, banked, set-associative cache that is accessed by performing an index lookup and a tag comparison to verify that the address targeted by the load or store instruction is in fact present in the cache. In the event of a data cache miss, the address may be sent to bus interface unit 150 to be retrieved from external memory coupled to processor 100. In some embodiments, a data closely-coupled memory (DCCM) may be provided in addition to or instead of data cache 140. As noted above, a CCM may effectively operate as a directly addressable on-chip memory with predictable access latency, in contrast to a cache that has a variable, probabilistic access latency. In embodiments that implement only a DCCM without a data cache, accesses within the memory range associated with the DCCM may be routed to the DCCM, whereas accesses outside of that range may ultimately be handled by bus interface unit 150.

Multiplier circuit 117 may be configured to implement integer multiplication instructions defined by the ISA. Divider circuit 118 may be configured to implement integer division instructions defined by the ISA. While multiplier circuit 117 may be pipelined, integer division is typically a complex, long-latency operation. Accordingly, in the illustrated embodiment, divider circuit 118 is implemented as a non-pipelined circuit, and instructions dependent on the results of an integer division instruction will stall until the division is complete. It is noted that while floating-point arithmetic is not explicitly discussed above, embodiments of core 110 may include execution circuits that support such operations.

As shown in FIG. 1, processor 100 includes memory processing unit (MPU) 120 interposed between core 110 and other elements of the memory hierarchy, such as instruction cache 130, data cache 140, and bus interface unit 150. In some embodiments, MPU 120 may include circuitry that supports the load/store pipeline, such as buffers and queues. For example, once load/store circuit 116 computes a memory address (or, in some cases, once fetch circuit 111 computes a fetch address), in some embodiments a memory access may be enqueued in a buffer accessible to MPU 120 (or within MPU 120) while awaiting downstream processing. Similarly, MPU 120 may implement a store buffer that is configured to hold post-commit store instructions (i.e., store instructions that have been completed and are intended to modify programmer-visible state) until they can be written to the memory subsystem via bus interface unit 150. In other embodiments, a unified store buffer may be employed as discussed below with respect to FIG. 4. It is noted that in other embodiments, some or all of the features of MPU 120 may be implemented elsewhere within processor 100, such as within load/store circuit 116. Additionally, in some embodiments, MPU 120 may implement protection features that, for example, enforce a privilege model or otherwise restrict access to defined addresses or regions of the memory address space, which may improve the stability and security of code execution. In embodiments of processor 100 that support virtual memory addressing, MPU 120 may additionally include circuitry related to address translation such as translation lookaside buffers (TLBs). As noted above, however, translation circuitry may be located elsewhere within processor 100 depending on design considerations (e.g., whether caches/CCMs are virtually or physically addressed).

Bus interface unit (BIU) 150 may be configured to interface processor 100 with other devices, such as memory, input/output devices, or other peripherals. External devices may either be on-chip (e.g., on the same silicon as processor 100, as in a system-on-a-chip (SoC) implementation) or off-chip. In some embodiments, BIU 150 may interface with external devices according to a version of the Advanced Microcontroller Bus Architecture (AMBA) standard, such as the Advanced High-performance Bus (AHB) bus protocol introduced in the AMBA 2 specification. Any other suitable bus architecture or protocol may be employed, however. BIU 150 may include circuits such as load and store queues configured to store pending load and store instructions as well as state machines or other circuits configured to implement the appropriate bus transaction logic.

In some embodiments of processor 100 that include an ICCM and/or a DCCM, these memory structures may be accessible via direct memory access (DMA) by off-processor devices in addition to being accessed by instructions executing in core 110. In such embodiments, processor 100 may include arbitration circuitry configured to arbitrate competing ICCM/DCCM accesses originating from processor 100 and DMA. For example, processor accesses may generally take priority over DMA accesses, although the arbitration circuitry may employ fairness and/or performance factors to ensure that DMA accesses are eventually serviced. In some embodiments, an ICCM/DCCM may be implemented in a banked manner with arbitration being performed on a per-bank basis, so that different banks may concurrently service accesses from processor 100, DMA, or a combination of these.

Programmable interrupt controller (PIC) 160 may be configured to facilitate the processing of interrupts originating externally to processor 100, such as asynchronous interrupts from peripherals that need to perform input/output. In various embodiments, PIC may implement circuitry configured to prioritize and mask interrupts according to user-programmable specifications, to support vectoring of interrupts to corresponding dedicated interrupt handler locations in memory, to support nesting and chaining of concurrent or successive interrupts, or any other suitable interrupt-related processing. In some embodiments, PIC 160 may process exceptions or faults arising from instruction execution within core 110 in addition to external interrupts.

Debug controller circuit 170 may be configured to implement a variety of debug-related features. For example, the RISC-V ISA defines an extensive debugging interface that can enable software to inspect and control the operation of processor 100 at a fine level of granularity. To support these features, debug controller circuit 170 may implement features such as breakpoints, timers, or other event-related triggers that, for example, facilitate pausing of instruction execution when defined events are detected, so that a user can inspect the state of processor 100 and associated memory at that time. Such features, along with features such as single-step execution, may facilitate the debugging of software executing on processor 100.

Some features of debug controller circuit 170 may also be used to perform hardware debug/test, for example as part of a silicon development or manufacturing test scenario. For example, debug controller circuit 170 may implement a command interface that may be accessible either via software or via hardware test features such as JTAG ports. The command interface may enable a user to read and/or write state elements within processor 100, such as register files, memory arrays, and the like. Thus, debug controller circuit 170 may facilitate the injection of test code into processor 100 in order to verify or debug a partially-operative hardware system.

Lastly, power management circuit 180 may be configured to coordinate power management features across processor 100. For example, power management circuit 180 may be configured to implement support for architecturally-defined power management states and to correctly transition processor 100 across those states, e.g., by controlling the sequence in which circuits of processor 100 are energized or depowered. Power management circuit 180 may also be configured to implement other power management features that are not necessarily architecturally defined, such as detecting and depowering idle circuits in order to decrease power consumption.

Turning now to FIG. 2, a pipeline diagram illustrating the execution timing 200 of an embodiment of processor 100 is depicted. As shown, instruction execution proceeds from top to bottom in a nine-stage pipeline, and each row of FIG. 2 represents one execution cycle. In this implementation, the operation of fetch circuit 111 is split across two cycles (denoted Fetch 1 and Fetch 2), during which instruction memory access occurs (e.g., to cache, ICCM, or IROM) and fetch buffers containing unaligned fetch results are populated. A stall may occur at the Fetch 1 stage in the event of a cache miss or line fill condition.

Operation of aligner circuit 112 occurs in the Align stage. A stall may occur here in certain cases of misalignment. For example, if multiple fetch buffers need to be scanned to identify instructions to be decoded, a stall may be necessary.

Decoder circuit 113 operates during the Decode stage. In one embodiment, decoder circuit 113 attempts to identify up to two instructions that can be issued together for execution, subject to dependencies, although other embodiments may attempt to identify greater degrees of concurrency. Stalls may occur at the Decode stage based on dependencies, instruction synchronization requirements, or other factors.

Following the Decode stage, processing depends upon which execution circuit an instruction is routed to. Instructions destined for integer execution circuits IEX0 114 or IEX1 115 enter the EX1 stage of Integer Pipe 0 or Integer Pipe 1, respectively. As discussed above, in one embodiment, IEX0 114 and IEX1 115 may each include 2 ALUs, one of which executes at the EX1 stage, and the other of which executes at the EX4 stage. As can be seen relative to the other execution circuit pipelines, including an ALU at the EX4 stage may enable forwarding of results from other execution circuits, and may prevent some instances of dependency-related stalls.

As shown, instruction commit decisions occur during the EX4 or Commit stage. For example, by the end of EX4, all speculative conditions that would prevent an instruction result from properly being committed to architectural state (such as branch mispredictions, exceptions, interrupts, or similar conditions) should be resolved. Either invalid state will be flushed or the instruction currently at EX4 will be permitted to modify architectural state at the EX5 or Writeback stage.

Load/store instructions enter the DC1 stage of the Load/Store Pipe and proceed to perform address generation and cache/DCCM lookup. In the illustrated case, loads and stores are effectively complete at the DC3 stage and can be forwarded, although they still need to proceed to the Commit and Writeback stages before they can be allowed to persistently modify architectural state. As will be discussed below with respect to FIG. 4, in various embodiments, data for completed store instructions may be maintained in a unified store buffer while they await commitment and until the data can be processed by subsequent stages of the memory hierarchy.

Multiply instructions enter the M1 stage of the Multiply Pipe. As shown, the Multiply Pipe has similar timing to the Load/Store Pipe, with results available for forwarding at the M3 stage. Like load/store instructions, however, multiply instructions still proceed to the Commit and Writeback stages prior to persistently modifying architectural state.

In some embodiments, the Load/Store Pipe and Integer Pipe 0 may be treated as a unit for instruction issue purposes. That is, during a given cycle, decoder circuit 113 may issue an instruction to one of these pipelines, but not the other. Integer Pipe 1 and the Multiply Pipe may be treated as a similar unit, such that decoder circuit 113 may issue up to two instructions per cycle for execution. In other embodiments, more aggressive issue scheduling may be implemented.

As noted above, divide instructions are issued from decoder circuit 113 to divider circuit 118, although in the illustrated embodiment, divide operations are long-latency, unpipelined operations. For completeness, the divider path is shown in FIG. 2 as an issue path alongside the remaining execution pipelines.

Exemplary Computer System

Turning now to FIG. 3, a block diagram of a system 300 including processor 100 is depicted. Processor 100 may be included within a variety of system configurations, one example of which is shown in FIG. 3. In various embodiments, system 300 may correspond to a general-purpose computer system, such as a desktop or portable computer, a mobile phone, or the like. System 300 may also correspond to any type of embedded system that may employ one or more instances of processor 100 as a dedicated controller. For example, system 300 may correspond to any type of computer peripheral device such as a mass storage device or storage array, printer, or the like, as well as control systems for automobiles, aviation, manufacturing, and other suitable applications.

As shown, system 300 includes processor 100, memory 310, storage 320, and an input/output (I/O) device interface 330 coupled via an interconnect 340. One or more I/O devices 350 are coupled via I/O interface 330. System 300 also includes a network interface 360 that may be configured to couple system 300 to a network 370 for communications with, e.g., other systems. (In various embodiments, network interface 360 may be coupled to interconnect 340 directly, via I/O interface 330, or according to a different configuration.) It is noted that some or all of the components of system 300 may be fabricated as a system-on-a-chip, although discrete combinations of components may also be employed.

Processor 100 corresponds to one or more instances of the processor configuration described above with respect to FIGS. 1-2, or a suitable variant thereof. Memory 310 may include random access memory (RAM) of any suitable configuration, such as working memory configured to store data and instructions usable by processor 100. Storage 320 may include mass storage devices such as magnetic, optical, or nonvolatile/flash memory storage, or a combination of these. In some embodiments, either of memory 310 or storage 320 may be omitted or integrated into the other as a single memory subsystem from the perspective of processor 100.

I/O interface 330 may be configured to interface between interconnect 340 and one or more other types of buses or interfaces. For example, interconnect 340 may correspond to the AHB interface discussed above (or another suitable type of high-bandwidth interconnect), and I/O interface 330 may be configured as a bridge device that enables coupling of different types of I/O devices to interconnect 340. I/O interface 330 may implement one or more interface protocols such as Universal Serial Bus, Firewire, or other suitable standards. I/O device(s) 350 may include any suitable type of storage, network interface, user interface, graphics processing, or other type of device. Network 370, if present, may be any suitable type of wired or wireless communications network, such as an Internet Protocol (IP) addressed local or wide-area network, a telecommunications network, or the like. Network interface 360, if present, may be configured to implement any suitable network interface protocol needed for communication with network 370.

Unified Store Buffer

Figure 4:
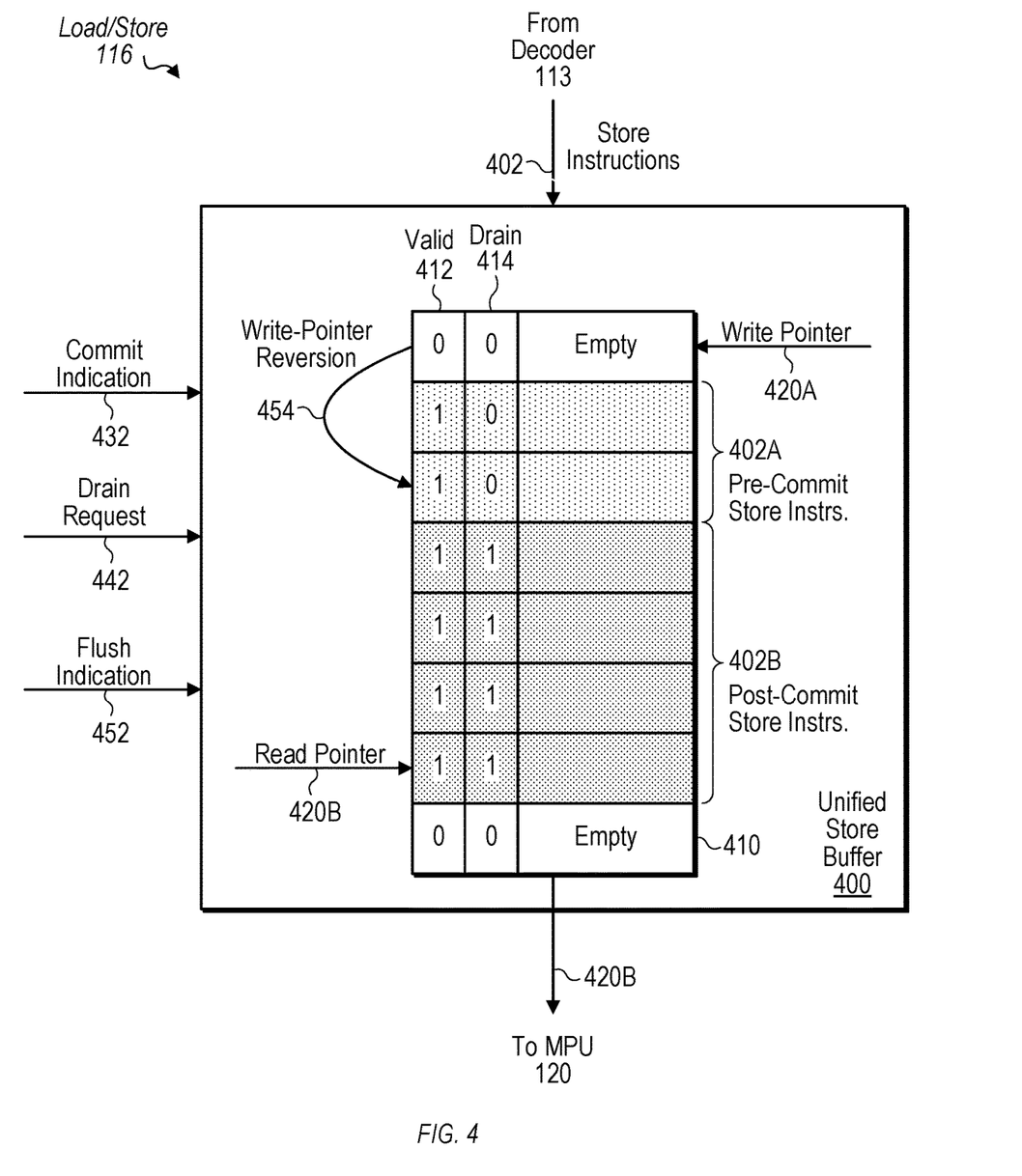
FIG. 4 is a block diagram illustrating one embodiment of a unified store buffer included in the processor.

Turning now to FIG. 4, a block diagram of a unified store buffer 400 is depicted. As noted above, in various embodiments, a processor supporting speculative execution may include a unified store buffer to store data of store instructions as they await commitment and until their data can be written to memory after commitment. Accordingly, in the illustrated embodiment, unified store buffer 400 is included in load store circuit 116 of processor 100 discussed above. In other embodiments, store buffer 400 may be located elsewhere such as along the data path between load store circuit 116 and memory processor unit 120, within memory processor unit 120, etc.

As shown, store buffer 400 may include multiple entries 410 (e.g., eight entries 410 in FIG. 4) as well as write and read pointers 420. In various embodiments, each entry 410 is capable of storing a respective one or more data values for a given store instruction, a valid bit 412, and a drain bit 414. In some embodiments, a given entry 410 may store additional data such as the memory address where a data value is to be written to memory—although this address may be maintained elsewhere in other embodiments.

In the illustrated embodiment, load store circuit 116 is configured to receive store instructions from decoder 113 discussed above and provide those instructions to unified store buffer 400 for temporary storage. Although not shown, in some embodiments, store instructions 402 may undergo one or more initial stages of processing at load store circuit 116 before arriving at store buffer 400. For example, a first stage of load store circuit 116 (e.g., DC1 in FIG. 2) may generate the memory address where data is to be stored in memory, and the data may become available for use by load store circuit 116. A second stage (e.g., DC2) may then route the generated address and data to store buffer 400 for storage. In some embodiments, store buffer 400 may correspond to a third stage of load store circuit 116 (e.g., DC3).

In various embodiments, load store circuit 116 tracks the storage of data in entries 410 using write pointer 420A and read pointer 420B. Accordingly, when new a store instruction 402 is received, load store circuit 116 (or more specifically buffer 400) examines write pointer 420A to identify an available entry 410 and store the data of the received store instruction 402 in that entry 410. In the illustrated embodiment, write pointer 420A points to the next available, empty entry 410 in buffer 400 and is advance after data of the newly received store instruction 402 is stored. (In another embodiment, write pointer 420A may identify the most-recently-written entry 410 in which case load store circuit 116 may write the data of the store instruction 402 into an adjacent entry 410 corresponding to the most-recently-written entry 410.) In various embodiments, load store circuit 116 also sets a valid bit 412 (e.g., by writing a one in the illustrated embodiment) to indicate that the entry 410 has valid data of a store instruction 402. Similarly, read pointer 420B may identify an oldest entry 410 having data of store instruction 402 in buffer 400. Accordingly, when load store circuit 116 reads data of a store instruction 402 from store buffer 400, it may access read pointer 420B to identify the appropriate entry 410 and advance pointer 420B as will be discussed in greater detail below. As entries 410 are written to and read from, pointers 420 may be advanced such that they eventually wrap around to pointing at earlier identified entries 410—for this reason, store buffer 400 may be described herein as implementing a circular buffer for storing data. In some embodiments, if buffer 400 happens to be full and another store instruction 402 is awaiting storage in buffer

400, load store circuit 116 may cause processor 100's execution pipeline to stall until an entry 410 in buffer 400 becomes available.

In various embodiments, load store circuit 116 uses drain bits 414 to track whether entries 410 include data for pre-commit store instructions 402A or data for post-commit store instructions 402B. When a store instruction 402 is initially stored in an entry 410 of buffer 400, the drain bit 414 of the entry 410 is initially cleared (e.g., set to zero in the illustrated embodiment) as the store instruction 402 has not yet been committed. As the store instruction 402 proceeds down the execution pipeline over one or more cycles, processor 100 is able to determine the outcomes of earlier instructions in the instruction sequence ahead of the store instruction 402—and eventually the outcome of the store instruction 402. In various embodiments, if processor 100 determines to commit the store instruction 402, processor 100 provides a corresponding commit indication 432 for that instruction 402. Store buffer 400 (or more generally load store circuit 116) may then set a corresponding drain bit 414 (e.g., by writing a one in the illustrated embodiment) for the entry 410 storing the data of that instruction 402 in order to indicated that the data is permitted to be drained/read from buffer 400 to downstream circuitry in the memory hierarchy such as dcache/DCCM 140, memory 310, and storage 320. For example, in FIG. 4, store buffer 400 includes two entries 410 having data of two pre-commit store instructions 402A and four entries 410 having data of four post-commit store instructions 402B. As such, drain bits 414 for four entries 410 associated with the post-commit store instructions 402B have been set.

As noted above, downstream circuitry handling the storage of data values may be unavailable to process data for a store instruction 402 once it commits and its corresponding drain bit 414 is set. In the illustrated embodiment, when downstream circuitry (such as memory processing unit 120) later becomes available to process incoming data from buffer 400, load store circuit 116 (or more specifically buffer 400) may receive a drain request 442 indicating downstream circuitry's availability and requesting that data for one or more committed store instructions 402 be provided. In response to receiving request 442, load store circuit 116 may access read pointer 420 to determine what entry 410 should be read next. Load store circuit 116 may examine the valid bit 412 and drain bit 414 to verify that the entry 410 has valid data of a committed store instruction 402B. If this is the case as indicated by both bits 412 and 414 being set, store buffer 400 may provide the data of that entry 410 to downstream circuitry. Load store circuit 116 may then clear the valid bit 412 for that entry 410 and advance read pointer 420B. In the illustrated embodiment, data of a committed store instruction 402B is output from store buffer 400 to memory processor unit 120, which may, in turn, store the data in dcache/DCCM 140 before the data is pushed to even further downstream circuitry in the memory hierarchy. In other embodiments, however, data of a committed store instruction 402B may be provided from store buffer 400 to other downstream circuitry such as one or more additional stages in load store circuit 116.

After data for a store instruction 402 has been stored in store buffer 400, it may remain there for one or more cycles before processor 100 determines to commit the store instruction 402. In that time, however, one or more events may occur that cause processor to determine to flush the execution pipeline and not commit the store instruction 402. For example, as noted above, processor 100 may determine that it speculatively executed down the wrong execution path after it mispredicted the outcome of a branch instruction on which the store instruction 402 depends. Other examples of events may include an interrupt occurring or an exception being detect. In the event that processor 100 does determine to flush the execution pipeline, in the illustrated embodiment, processor 100 provides a flush indication 452 to cause store buffer 400 to flush data for any pre-commit store instructions 402A.

In various embodiments, in response to receiving flush indication 452, load store circuit 116 (or more specifically unified store buffer 400) may examine entries 410 starting at an entry 410 identified by write pointer 420A and working back toward an entry 410 identified by read pointer 420B to determine whether the entries 410 include valid data (as indicated by valid bit 412) and belonging to a non-committed store instruction 402A (as indicated by drain bit 414). For each encountered entry 410 meeting these criteria, load store circuit 116 may clear the valid bit 412 (e.g., by writing zero in the illustrated embodiment). Load store circuit 116 may also perform a write-pointer reversion 454 in which write pointer 420A is reverted back one or more entries 410 so that it points to an entry 410 adjacent to the entry 410 belonging to the most-recently committed store instruction 402B (or, in other embodiments, points to the entry 410 belonging to the most-recently committed store instruction 402). For example, in the write-pointer reversion 454 depicted in FIG. 4, write pointer 420A has been moved back two entries 410 due to the two entries 410 having data of pre-commit store instructions 402A. In various embodiments, because the valid bits 412 of these entries 410 have now been cleared and write pointer 420A has now been reverted, the data in these entries 410 can now be overwritten when subsequent store instructions 402 are received.

Figure 5A:
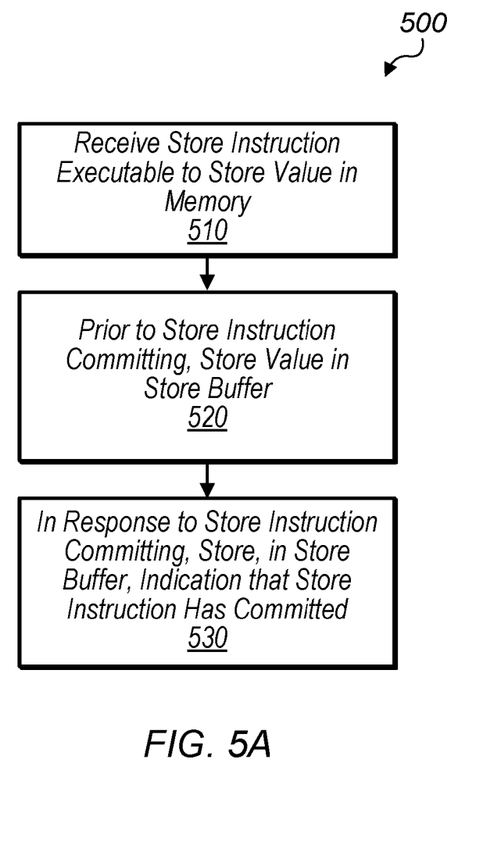
FIGS. 5A-5B are flow diagrams illustrating embodiments of methods associated with a unified store buffer.

Turning now to FIG. 5A, a flow diagram of a method 500 is depicted. Method 500 is one embodiment of a method that may be performed by an integrated circuit having an execution pipeline with a load store circuit such as processor 100. In many instances, performance of method 500 may improve utilization of a processor's resources as noted above.

In step 510, a load store circuit (e.g., load store circuit 116) receives a first store instruction (e.g., a store instruction 402) executable to store a first value in a memory (e.g., dcache/DCCM 140, memory 310, or storage 320) accessible to the integrated circuit. In some embodiments, the first store instruction is received from a decoder (e.g., decoder 113) of the execution pipeline.

In step 520, prior to the first store instruction committing, the load store circuit stores the first value in a store buffer (e.g., store buffer 400). In some embodiments, the load store circuit identifies an entry (e.g., an entry 410) in the store buffer to store the first value by accessing a write pointer (e.g., write pointer 420A) that identifies an available entry to store a newly received value, and the load store circuit advances the write pointer such that the store buffer implements a circular buffer. In some embodiments, step 520 further includes the load store circuit setting a validity indication (e.g., a valid bit 412) for the identified entry responsive to storing the first value in the entry of the store buffer. In various embodiments, the first value resides in the identified entry until after the first store instruction commitments. In some embodiments, the load store circuit stores, in the identified entry, a memory address identified by the first store instruction and indicating where the first value is to be stored in the memory.

In step 530, in response to the first store instruction committing, the load store circuit stores, in the store buffer, an indication (e.g., drain bit 414) that the first store instruction has committed. In various embodiments, the integrated circuit reads the stored indication to determine whether the first store instruction has committed and, responsive to the read indication, provides the first value for storage in the memory. In some embodiments, the integrated circuit identifies an entry (e.g., an entry 410) in the store buffer that includes the first value by accessing a read pointer (e.g., read pointer 420B) of the store buffer, where the read pointer specifies an entry having a next value to be read from the store buffer. In such an embodiment, the integrated circuit reads the first value from the identified entry to provide the first value for storage in the memory. In some embodiments, the first value is provided to a data cache (e.g., data cache 140) included in the integrated circuit.

In various embodiments, method 500 further includes the load store circuit storing, in the store buffer, a second value of a second store instruction received by the load store circuit, receiving an indication (e.g., flush indication 452) that the second store instruction is not to be committed, and in response to the received indication, flushing the second value from the store buffer. In some embodiments, flushing the second value includes the load store circuit reverting a write pointer (e.g., write pointer 420A) of the store buffer to cause the second value to be subsequently overwritten. In some embodiments, flushing the second value includes the load store circuit clearing a validity bit (e.g., validity bit 412) for an entry including the second value.

Figure 5B:
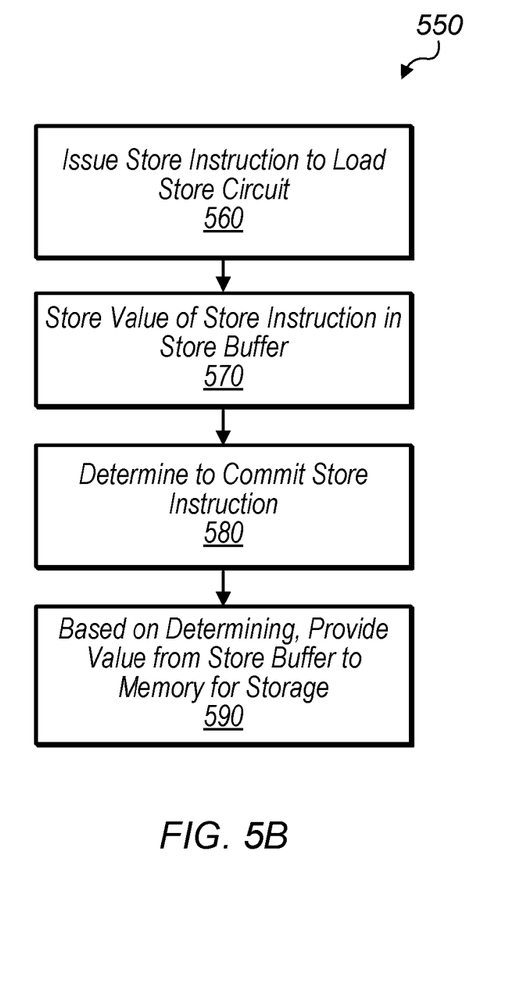

Turning now to FIG. 5B, a flow diagram of a method 550 is depicted. Method 550 is one embodiment of a method that may be performed by a processor (or more generally a computing device) having unified store buffer 400 such as processor 100. In many instances, performance of method 550 may improve utilization of a processor's resources as noted above.

Method 550 begins in step 560 with a processor issuing a first store instruction (e.g., a store instruction 402) to a load store circuit (e.g., load store circuit 116) of the processor, the first store instruction being executable to store a first value in memory (e.g., dcache/DCCM 140, memory 310, or storage 320). In step 570, the load store circuit stores the first value in a store buffer (e.g., store buffer 400) of the processor. In some embodiments, step 570 includes using a write pointer (e.g., write pointer 420A) of the store buffer to identify an entry (e.g., an entry 410) in the store buffer to store the first value. In step 580, the processor determines, subsequent to the storing, to commit the first store instruction. In some embodiments, in response to the determining, the load store circuit stores a bit (e.g., a drain bit 414) in the store buffer, the bit indicating that the first store instruction has been committed and that the first value is permitted to be provided to the memory. In various embodiments, the store buffer simultaneously stores values of committed store instructions (e.g., instructions 402B) and values of non-committed store instructions (e.g., instructions 402A). In step 590, the processor provides, based on the determining, the first value from the store buffer to the memory for storage. In some embodiments, step 590 includes using a read pointer (e.g., read pointer 420B) of the store buffer to identify the entry to read the first value from the store buffer.

In various embodiments, method 550 further includes the processor determining that a misprediction of a branch instruction has occurred and, in response to the misprediction, the processor causing (e.g., via a flush indication 452) one or more values of non-committed store instructions to be flushed from the store buffer and not written to the memory. In some embodiments, the load store circuit flushes the one or more values by reverting a write pointer (e.g., write pointer reversion 454) of the store buffer to a previously identified entry of a committed store instruction.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An integrated circuit, comprising:
   an execution pipeline comprising a load store circuit, wherein the load store circuit is configured to:
   receive a first store instruction executable to store a first value in a memory accessible to the integrated circuit;
   prior to the first store instruction committing, store the first value in an entry of a store buffer within the load store circuit;
   store, in the entry of the store buffer, a validity indication for the entry responsive to storing the first value in the entry of the store buffer, wherein the first value resides in the entry until after the first store instruction commits; and
   in response to the first store instruction committing, store, in the entry of the store buffer, a commit indication that the first store instruction has committed.

2. The integrated circuit of claim 1, wherein the integrated circuit is further configured to:
   read the stored commit indication to determine whether the first store instruction has committed; and
   responsive to the read commit indication, provide the first value for storage in the memory.

3. The integrated circuit of claim 2, wherein the integrated circuit is further configured to:
   identify the entry in the store buffer that includes the first value by accessing a read pointer of the store buffer, wherein the read pointer specifies an entry having a next value to be read from the store buffer; and
   read the first value from the identified entry to provide the first value for storage in the memory.

4. The integrated circuit of claim 2, wherein the first value is provided to a data cache included in the integrated circuit.

5. The integrated circuit of claim 1, wherein the first store instruction is received from a decoder of the execution pipeline; and wherein the load store circuit is further configured to:
identify the entry in the store buffer to store the first value by accessing a write pointer that identifies an available entry to store a newly received value; and
advance the write pointer such that the store buffer implements a circular buffer.

6. The integrated circuit of claim 5, wherein the load store circuit is further configured to:
store, in the identified entry, a memory address identified by the first store instruction and indicating where the first value is to be stored in the memory.

7. The integrated circuit of claim 1, wherein the load store circuit is further configured to:
store, in the store buffer, a second value of a second store instruction received by the load store circuit;
receive an indication that the second store instruction is not to be committed; and
in response to the received indication, flush the second value from the store buffer.

8. The integrated circuit of claim 7, wherein flushing the second value includes the load store circuit reverting a write pointer of the store buffer to cause the second value to be subsequently overwritten.

9. The integrated circuit of claim 7, wherein flushing the second value includes the load store circuit clearing a validity bit for an entry including the second value.

10. A method, comprising:
a processor issuing a first store instruction to a load store circuit of the processor, wherein the first store instruction is executable to store a first value in memory;
the load store circuit storing the first value in an entry of a store buffer of the processor wherein the storing includes storing a validity bit in the entry;
subsequent to the storing, the processor determining to commit the first store instruction;
in response to the determining, the load store circuit storing a drain bit in the entry, wherein the drain bit indicates that the first store instruction has been committed and that the first value is permitted to be provided to the memory; and
based on the drain bit, the processor providing the first value from the store buffer to the memory for storage.

11. The method of claim 10,
wherein the store buffer is configured to simultaneously store values of committed store instructions and values of non-committed store instructions.

12. The method of claim 10, wherein the storing includes using a write pointer of the store buffer to identify the entry in the store buffer to store the first value; and
wherein the providing includes using a read pointer of the store buffer to identify the entry to read the first value from the store buffer.

13. The method of claim 10, further comprising:
the processor determining that a misprediction of a branch instruction has occurred; and
in response to the misprediction, the processor causing one or more values of non-committed store instructions to be flushed from the store buffer and not written to the memory.

14. The method of claim 13, further comprising:
the load store circuit flushing the one or more values by reverting a write pointer of the store buffer to a previously identified entry of a committed store instruction.

15. A computing device, comprising:
a processor comprising a load store circuit configured to facilitate execution of store instructions executable to store data values in memory; and
wherein the load store circuit is configured to:
write the data values to a store buffer while the store instructions commit and until the data values are written to memory, wherein writing the data values includes:
storing a first data value of a first store instruction in the store buffer;
receiving a first indication that the first store instruction is being committed by the processor; and
in response to the first indication, storing a commit value in the store buffer to indicate that the first data value is permitted to be written to memory.

16. The computing device of claim 15, wherein the load store circuit is further configured to:
store a second data value of a second store instruction in the store buffer;
receive a second indication that the second store instruction is not being committed; and
in response to the second indication, store a value in the store buffer to indicate that the second data value is not permitted to be written to memory.

17. The computing device of claim 16, wherein the processor is configured to provide the second indication in response to determining that an outcome of a branch instruction has been mispredicted.

18. The computing device of claim 16, wherein the load store circuit is further configured to:
in response to the second indication, reset a write pointer of the store buffer to an entry corresponding to a most recently committed store instruction, wherein the write pointer is usable by the load store circuit to identify an available entry in the store buffer to store a newly received data value of a store instruction.

* * * * *